United States Patent
Bernett

(10) Patent No.: US 6,487,039 B1
(45) Date of Patent: Nov. 26, 2002

(54) DISC-DRIVE MOUNTING METHOD AND APPARATUS TO REDUCE NOISE

(75) Inventor: Frank W. Bernett, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 117 days.

(21) Appl. No.: 09/602,781

(22) Filed: Jun. 23, 2000

Related U.S. Application Data

(60) Provisional application No. 60/140,865, filed on Jun. 24, 1999, and provisional application No. 60/145,502, filed on Jul. 23, 1999.

(51) Int. Cl.$^7$ ............................................. G11B 33/08
(52) U.S. Cl. ................................................ 360/97.02
(58) Field of Search ........................... 360/97.01–98.01; 369/75.1

(56) References Cited

U.S. PATENT DOCUMENTS

| | | | |
|---|---|---|---|
| 4,553,183 A | 11/1985 | Brown et al. ................. | 360/98 |
| 4,724,500 A | 2/1988 | Dalziel ........................ | 360/103 |
| 4,896,777 A | 1/1990 | Lewis .......................... | 211/41 |
| 4,947,093 A | 8/1990 | Dunstan et al. ............. | 318/560 |
| 5,124,855 A | 6/1992 | Dew et al. ................. | 360/97.02 |
| 5,149,048 A | 9/1992 | Morehouse et al. ........ | 248/632 |
| 5,161,770 A | 11/1992 | Morehouse et al. ........ | 248/632 |
| 5,216,582 A | 6/1993 | Russell et al. .............. | 361/395 |
| 5,223,996 A | 6/1993 | Read et al. ............... | 360/97.02 |
| 5,282,100 A | 1/1994 | Tacklind et al. .......... | 360/97.02 |
| 5,296,986 A | 3/1994 | Morehouse et al. ........ | 360/106 |
| 5,400,196 A | 3/1995 | Moser et al. .............. | 360/97.02 |
| 5,426,562 A | 6/1995 | Morehouse et al. ........ | 361/685 |
| 5,463,527 A | 10/1995 | Hager et al. ................. | 361/685 |
| 5,550,688 A | 8/1996 | Aoyagi et al. ............ | 360/99.08 |
| 5,663,943 A * | 9/1997 | Yanagisawa et al. ...... | 369/75.1 |
| 5,673,158 A | 9/1997 | Ichimura ................. | 360/97.01 |
| 5,768,249 A | 6/1998 | Ro et al. ..................... | 369/263 |
| 5,777,815 A | 7/1998 | Kasiraj et al. ................ | 360/75 |
| 5,777,821 A * | 7/1998 | Pottebaum ............... | 360/97.02 |
| 5,781,373 A | 7/1998 | Larson et al. ............ | 360/97.02 |
| 5,825,586 A | 10/1998 | Teshima ................... | 360/99.04 |
| 6,052,255 A * | 4/2000 | Kawabe et al. .......... | 360/97.02 |
| 6,243,228 B1 * | 6/2001 | Yoshida et al. .......... | 360/97.02 |
| 6,275,352 B1 * | 8/2001 | Tadepalli et al. ........ | 360/97.02 |

\* cited by examiner

Primary Examiner—Jefferson Evans
(74) Attorney, Agent, or Firm—Derek Berger

(57) ABSTRACT

A method and apparatus is described for reducing and isolating actuator noise in disc drives. An isolation mount is provided between the disc-drive case and its external mounting assembly. A disc drive that includes an external mounting member, a disc case, and an actuator assembly mounted within the disc case. In some embodiments, the disc drive also includes at least one damper holding the disc case to the external mounting member that allows rotational movement of the disc case relative to the external mounting member in order to reduce the emission of sound from the disc case. Another aspect of the invention provides a disc drive that includes an external mounting member, a disc case, an actuator assembly mounted within the disc case, and at least one damper holding the disc case to the external mounting member, the damper including a softer part and a stiffer part, wherein the softer part acts primarily for relatively small movements of the disc case and the stiffer part acts primarily for relatively large movements of the disc case.

10 Claims, 6 Drawing Sheets

DISC-DRIVE MOUNTING METHOD AND APPARATUS TO REDUCE NOISE

RELATED APPLICATIONS

This application claims the benefit under 35 U.S.C. 119(e) of U.S. Provisional Application Ser. No. 60/140,865 filed Jun. 24, 1999.

This Application claims benefit of 60/140,865 Jun. 24, 1999 and claims benefit of 60/145,502 Jul. 23, 1999.

FIELD OF THE INVENTION

The present invention relates to the field of mass-storage devices. More particularly, this invention relates to a method and apparatus for reducing and/or isolating actuator and other internal noise from disc drives.

BACKGROUND OF THE INVENTION

Devices that store data are key components of any computer system. Computer systems have many different types of devices where data can be stored. One common device for storing massive amounts of computer data is a disc drive. The basic parts of a disc drive are a disc assembly having at least one disc that is rotated, an actuator that moves a transducer to various locations over the rotating disc, circuitry that is used to write and/or read data to and from the disc via the transducer, and a bus interface to connect the disc drive into an information-handling system. The disc drive also includes circuitry for encoding data so that it can be successfully retrieved from and written to the disc surface. A microprocessor controls most of the operations of the disc drive, in addition to passing the data back to the requesting computer and receiving data from a requesting computer for storing to the disc.

The disc drive includes a transducer head for writing data onto circular or spiral tracks in a magnetic layer the disc surfaces and for reading the data from the magnetic layer. In some drives, the transducer includes an electrically driven coil (or "write head") that provides a magnetic field for writing data, and a magneto-resistive (MR) element (or "read head") that detects changes in the magnetic field along the tracks for reading data.

The transducer is typically placed on a small ceramic block, also referred to as a slider, that is aerodynamically designed so that it flies over the disc. The slider is passed over the disc in a transducing relationship with the disc. Most sliders have an air-bearing surface ("ABS") which includes rails and a cavity between the rails. When the disc rotates, air is dragged between the rails and the disc surface causing pressure, which forces the head away from the disc. At the same time, the air rushing past the cavity or depression in the air bearing surface produces a negative pressure area. The negative pressure or suction counteracts the pressure produced at the rails. The slider is also attached to a load spring which produces a force on the slider directed toward the disc surface. The various forces equilibrate so the slider flies over the surface of the disc at a particular desired fly height. The fly height is the distance between the disc surface and the transducing head, which is typically the thickness of the air lubrication film. This film eliminates the friction and resulting wear that would occur if the transducing head and disc were in mechanical contact during disc rotation. In some disc drives, the slider passes through a layer of lubricant rather than flying over the surface of the disc.

Information representative of data is stored on the surface of the storage disc. Disc-drive systems read and write information stored on tracks on storage discs. Transducers, in the form of read/write heads attached to the sliders, located on both sides of the storage disc, read and write information on the storage discs when the transducers are accurately positioned over one of the designated tracks on the surface of the storage disc. In some disc drives, the tracks are a multiplicity of concentric circular tracks. In other disc drives, a continuous spiral is one track on one side of a disc drive. Servo feedback information written on the disc(s) is used to accurately locate the transducer.

The transducer is also said to be moved to a "target track." Once the storage disc spins and the read/write head is accurately positioned above a target track, the read/write head can store data onto a track by writing information representative of data onto the storage disc. Similarly, reading data on a storage disc is accomplished by positioning the read/write head above a target track and reading the stored material on the storage disc. To write on or read from different tracks, the read/write head is moved radially across the tracks to a selected target track in an operation called a "seek." A seek is movement of an actuator assembly from a first track to a second target track. Acoustic emissions are more prevalent during rapid disc seek operations. To perform a seek, the actuator assembly is moved to the required position and held very accurately during a read or write operation using the servo information.

Typically, current is applied to an electromagnetic rotary motor in the actuator, causing the actuator assembly to rotate rapidly relative to the disc-drive enclosure. There is a quick rotational impulse transmitted to the disc drive case as the actuator is accelerated, and another quick rotational impulse in the opposite direction transmitted to the disc drive case as the actuator is decelerated. That is, the rotary acceleration of the actuator causes a rotary acceleration of the case in the opposite direction. These and other mechanical vibrations are radiated from the disc drive case as acoustic noise.

The detrimental impact of high acoustic emissions from disc drives is well known. Acoustic noise emissions from computer fans and disc drives result in an unpleasant workplace environment, particularly when many disc drives are concentrated in one area. The "plink" or "tick" sound from each of numerous seek operations of numerous disc drives, though each is individually small, adds up to a large overall noise problem for large installations. The acoustic noise may also be absorbed by neighboring disc drives, possibly causing errors in those drives due to increased vibration levels. Government agencies in many countries are now requiring that the average level of sound energy from office equipment be substantially reduced. Computer manufacturers are also placing acoustic-emission standards on disc drive manufacturers. Manufacturers of disc drives also recognize that certain performance improvements for disc drives, namely increased disc rotational velocity and increased actuator speed and frequency, contribute to unwanted acoustic noise. Because many environments where disc drives are used are sensitive to the amount of acoustic emissions (or noise) coming from an operating disc drive, it is therefore desirable to reduce such acoustic noise.

Several methods to reduce the intensity of unwanted acoustic noise have been attempted. Among the several methods are the use of external dampening techniques for the entire disc drive. For example, mechanically isolating the cover of a disc drive from the mechanical reinforcement structure with a continuous airspace. Some of the unwanted acoustic noise emanate from a "drum-like" top cover and from the base plate of the disc drive. Some improvements have been made addressing the acoustic noise that escape from the top cover, for example using cover dampers and adhesives with inherent dampening properties between the base and the cover.

Other attempts try to isolate the actuator from the disc-drive case in order to reduce the unwanted acoustic emissions during disc seeks. Such actuator isolation conventionally includes using plastic and rubber mounts on the pivot bearing assembly of the actuator. Some attempts have either centered on dampening the acoustic energy already in a disc base plate by placing foam between a printed circuit board and the base plate, or on decoupling the spindle and actuator mechanism from its enclosure by using a plurality of rubber isolator mounts. Other attempts include moving the actuator with less force to reduce impulse forces and thus reduce large acoustic spikes, however this can increase the time needed to complete the seek. Nevertheless, each of these improvements have proved marginal, and some have been prohibitively costly. There is a need for a method and apparatus to substantially reduce unwanted acoustic emissions from the disc drive due to the actuator seeks and disc rotation. There is also a need for a method and apparatus to reduce the amount of vibration and shock absorbed into the disc drive from the external environment. There is also a need for an inexpensive method and apparatus.

SUMMARY OF THE INVENTION

A method and apparatus is described for reducing and isolating actuator noise in disc drives. An isolation mount is provided between the disc-drive case and its external mounting assembly. In some embodiments, the isolation mount includes a soft mount that provides a vibration- and noise-dampening function for relatively small movements (in some embodiments, the isolation mount is designed very "soft" in order to produce a natural frequency of less than about 100 Hz about the center of mass; in other embodiments, the design is for a natural frequency of less than about 300 Hz) and a stiffer mount that provides a shock-isolation function for relatively large movements. In some embodiments, the isolation mount allows the disc drive to rotate somewhat freely about its center of gravity, in order to reduce the acoustic energy emitted or transferred to the external mounting assembly by an actuator seek.

Most generally, a disc drive system includes a disc case having a base plate, a rotatable disc and an actuator mounted to the base plate, and a cover. The disc case is held to an external mount. A transducer is mounted to the actuator in transducing relation to the disc. The disc case is acoustically isolated from the mount.

One aspect of the present invention provides a disc drive that includes an external mounting member, a disc case, and an actuator assembly mounted within the disc case. The actuator assembly has a shaft, the shaft having a rotational axis. The disc drive also includes at least one damper (a structure that dampens sound and/or vibration) holding the disc case to the external mounting member that allows rotational movement of the disc case relative to the external mounting member in order to reduce the emission of sound from the disc case.

Another aspect of the present invention provides a disc drive that includes an external mounting member, a disc case, an actuator assembly mounted within the disc case, and at least one damper holding the disc case to the external mounting member, the damper including a softer part and a stiffer part, wherein the softer part acts primarily for relatively small movements of the disc case and the stiffer part acts primarily for relatively large movements of the disc case.

Yet another aspect of the present invention provides a method for reducing vibrations of an actuator assembly entering a case of a disc drive. The method includes allowing more rotational movement of the case within a frame than is allowed of another mode of movement, and dampening rotational vibrations of the case.

DESCRIPTION OF THE PREFERRED EMBODIMENT

Figure 1:
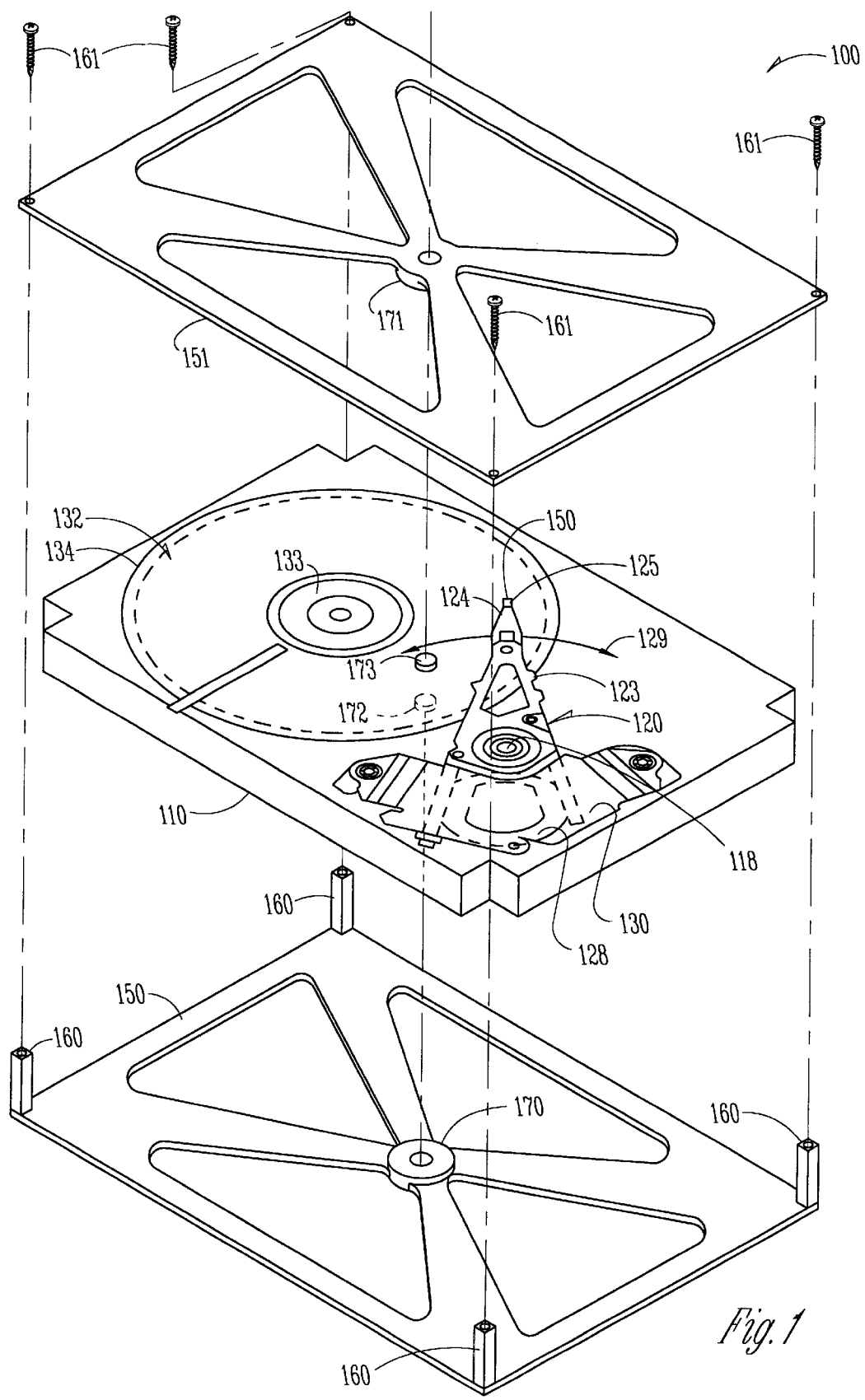
FIG. 1 is an exploded view of a disc drive 100 with a multiple disc stack and a rotary mount.

In the following detailed description of the preferred embodiments, reference is made to the accompanying drawings which form a part hereof, and in which are shown, by way of illustration, specific embodiments in which the invention may be practiced. It is to be understood that other embodiments may be utilized and structural changes may be made without departing from the scope of the present invention.

High-performance disc drives require high actuator speeds in order to achieve lower access times (i.e., in particular, to reduce the contribution to access time due to seek operations). To reduce seek time, the actuator must be accelerated and decelerated at higher rates relative to the disc case. Some of the acceleration energy is transmitted to the disc drive case and then to the external mounting structure and emitted as sound. The present invention allows some of this energy to instead move the disc case relative to its external mounting structure, thus reducing the energy transmitted to the external mounting structure (e.g., including the thin sheet metal case in embodiments such as inexpensive personal computers or television interface boxes that include a disc drive), thus reducing the amount of emitted sound.

When a disk drive seeks, it imparts forces into the structure holding it. These forces cause vibrations to occur in the structure, causing acoustic noise and motion in neighboring drives. The structural vibrations are estimated to cause 75% of the seek-related noise a person hears from a computer system. The motion in the neighboring drives cause off-track conditions to occur which slows down performance and in extreme conditions can cause errors.

Further, computer manufacturers and Web TV manufacturers are complaining about the noise created by disk drives seeking. Most of the noise is coming from the drive exciting vibration mode in their chassis.

A disk drive acts like a rigid body in the frequency range that most of the seek energy is in. The forces that exist during seeking produce almost a pure couple (torque) on this rigid body. When this occurs, the rigid body wants to rotate about its center of gravity. Generally, it receives no translational forces, only rotational ones. If the mount holding the drive were to allow the drive to rotate about its center of gravity, then the mount would not see any shaking forces. This mount is what the structure holding the drive connects to, so it would not receive any shaking force. The elimination of the shaking force means the elimination of that part of seek acoustics that comes from this shaking. For high-end drives in storage arrays, this type of mount reduces the vibration induced off-track that they otherwise have to deal with. In some embodiments, about ½ of the tracking budget is assumed to be used by this vibration-induced condition. This type of mount increases the performance of some embodiments for such uses as in storage arrays.

This phenomenon has been demonstrated by suspending a drive on a wire at its center of gravity. During seeking, one can measure the rotational motion and the translational motion of the drive. There was almost no translation at the center of gravity, as the theory predicts. Also the amount of rotational motion is so small that it is hard to see. This makes sense because the rotational inertia of the drive is so much larger than the actuator.

Some computer manufacturers are starting to use shock-mount systems to isolate the drive from the chassis. The problem with these shock mounts is that they create a rotary vibration mode of the disk drive. If the frequency of this mode is too high (about 70 Hz and higher), it creates both tracking and settling problems for the servo system. This leads to decreased performance, and possibly data integrity issues. If you make the shock mounts soft enough to have the rotary mode down around 40 Hz, they alone are not stiff enough to protect the drive from translational shock. Along with this problem, the force center of the shock mounts must coincide with the center of gravity of the disk drive in order to keep linear vibrations from causing a rotary motion of the disk drive. Rotary motion causes the heads to be knocked off track causing performance problems.

In some embodiments, the invention provides a mounting for the disc drive that allows at least a portion to rotate about its center of mass as a result of actuator seek operations, in order to reduce the amount of vibration transmitted to the structure holding the disk drive and/or to reduce the amount of emitted sound.

Figure 3:
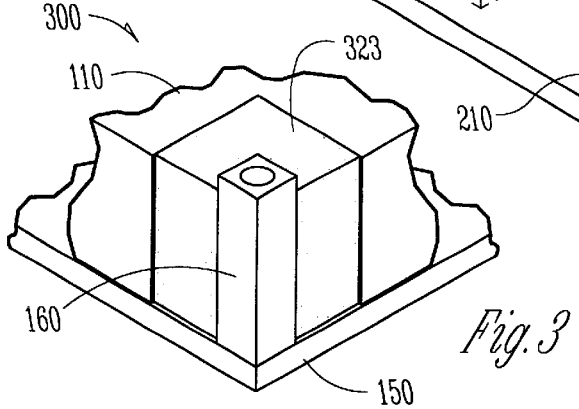
FIG. 3 is an isometric cutaway view of an isolation mount 300 incorporating the present invention.

In some embodiments, a system of one or more soft mounts (that are, in various embodiments, foam rubber or plastic, springs, rubber grommets, visco-elastic adhesives, rubber or silicone parts, etc.) that produce a force center at or near the center of mass (some times called the center of gravity) of the disc drive. In some embodiments, these mounts are soft enough so as to produce a rotational natural frequency of less than about 300 Hz (in some other embodiments, less than about 100 Hz) about the drive center of mass. For example, FIG. 3 shows one of a plurality of such soft mounts 323 that allow disc case 110 to rotate about its center of mass relative to external mount 150/160. Another such embodiment (shown in FIG. 11) is similar to that of FIG. 9, except that bearing 970 and axle 971 are omitted leaving the disc case 110 to float on pads 920–923, and soft adhesive pads 920, 921, 922, and 923 act to provide a force center at or near the center of mass shown as the dotted line though the disc stack.

In some embodiments, such soft mounts are so soft that they allow too much motion for typical and expected external shocks seen by a typical drive 100. Thus, in some embodiments, an additional set of bumpers (stiffer mounts) are provided that normally are not contacted (e.g., mounted to external mounting member 150 so they do not normally touch disc case 110, or mounted to disc case 110 so they do not normally touch external mounting member 150), such that they restrict motion and protect the drive when a large shock is experienced. Typically such stiff mounts have only enough clearance that under normal operation, they are not in contact with both the disc case 110 and the external mounting member 150.

In some embodiments, mount 323 is a graded pad having very soft characteristics for small movements, but progressively stiffer characteristics for larger and larger movements.

Figure 10:
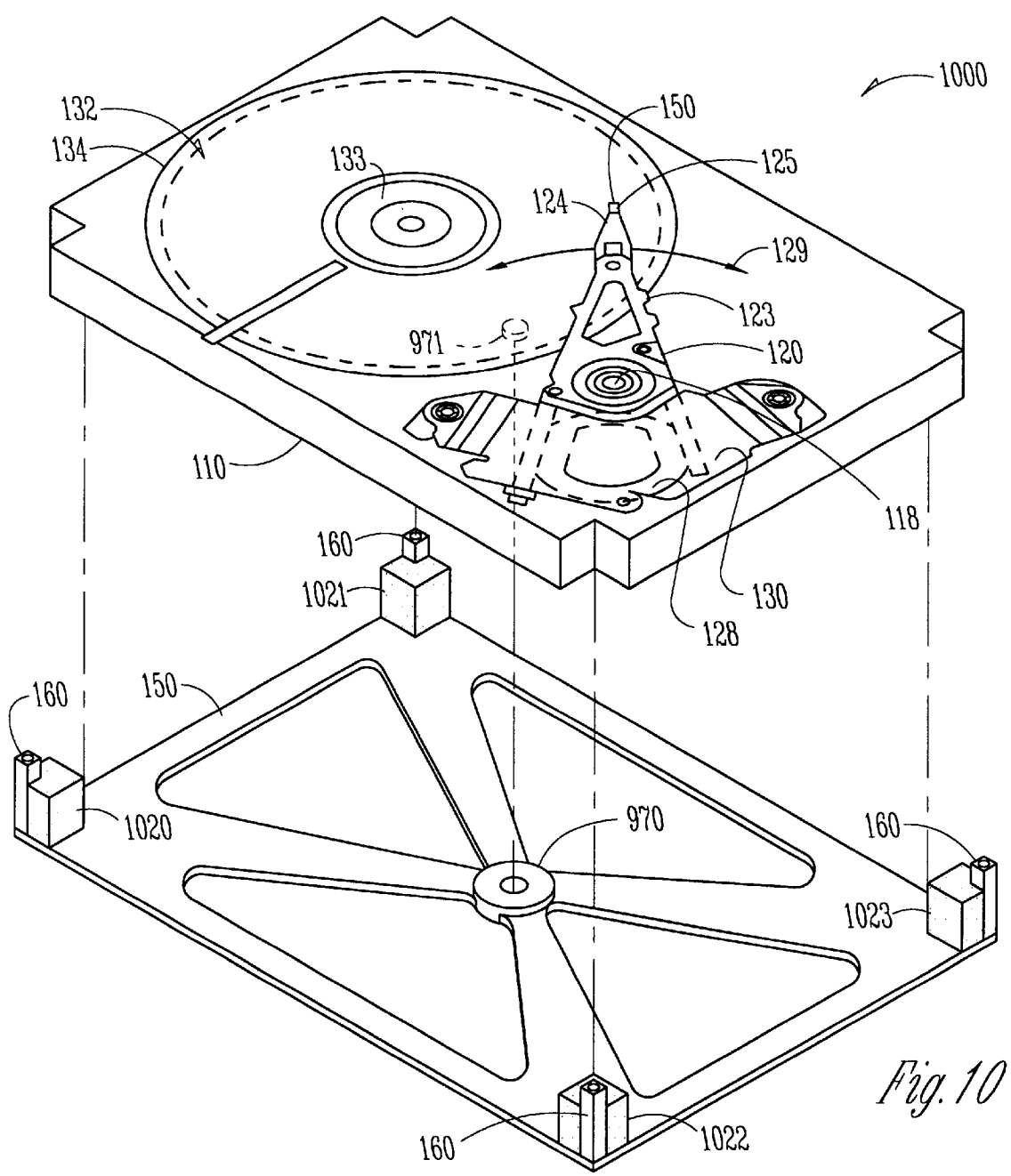
FIG. 10 is an exploded view of a disc drive 1000 with a multiple disc stack and a rotary mount.
Figure 11:
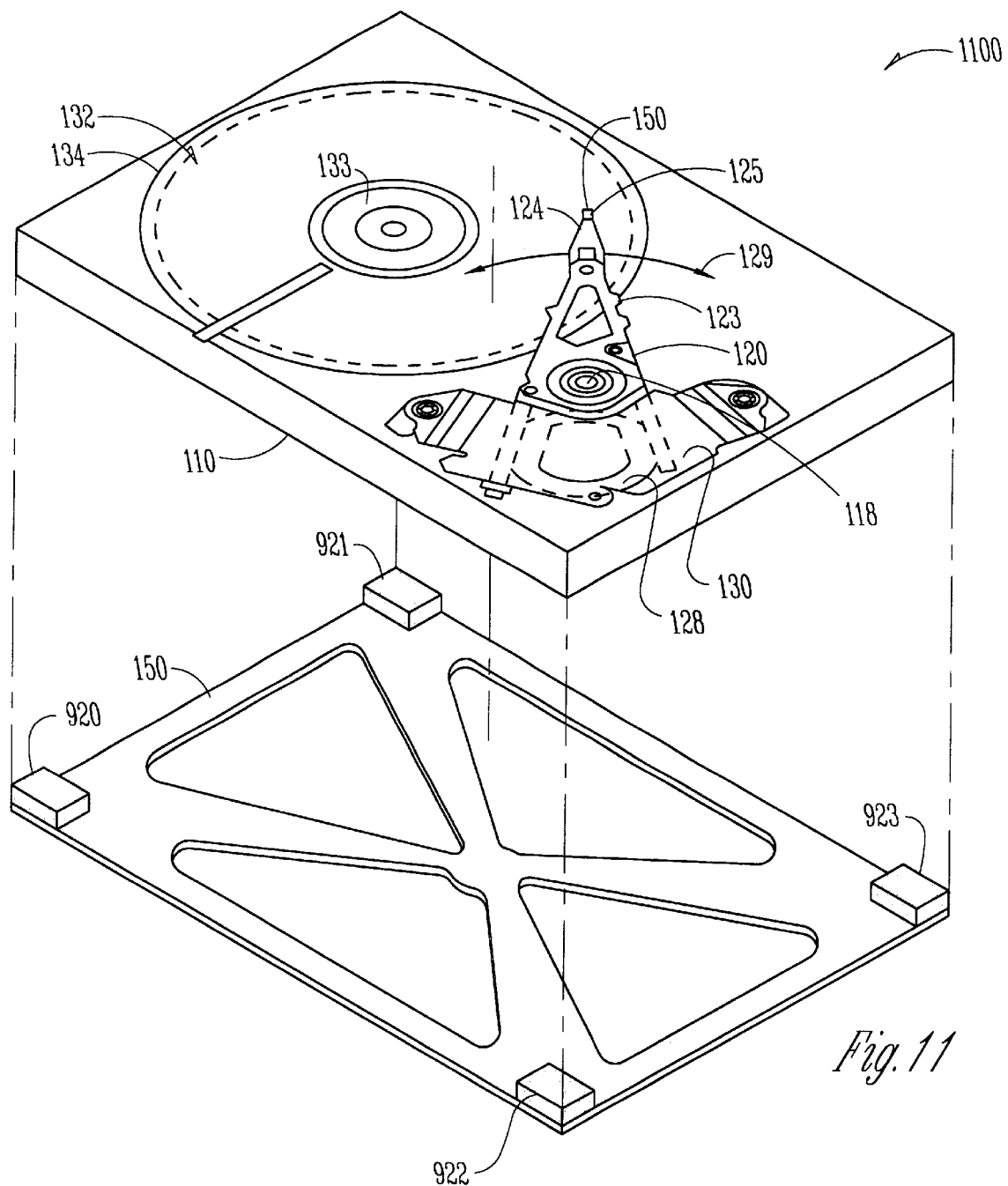
FIG. 11 is an exploded view of a disc drive 1100 with a multiple disc stack and a rotary mount.

In some embodiments, the invention uses two sets of mounts, the first (e.g., soft mounts 220 and 221 of FIG. 2, or soft mounts 920, 921, 922, and 923 of an embodiment similar to FIG. 9, but not having bearing 970–971 as shown in FIG. 11) is designed to create a force center that coincides with the drive's center of gravity and be soft enough to have the rotary mode created by these mounts below about 50 Hz. There would be little to no reduction in the performance of a disc drive using this soft mount. To protect the drive from shocks, a second, stiffer set of mounts (e.g., 230 and 231) or limiters would be placed so when the drive starts to move after the shock, it would come in contact with these mounts. Under normal drive operation, the drive would not be touching the second set of mounts. This system could be employed when the drive is held in a horizontal position. If the drive were to be placed in a vertical position, the soft mounts would sag and the drive would end up touching the stiffer mounts. This would create the problem that normally occurs with conventional mounts described above. To cover this situation, a more complicated mount is described (e.g., FIGS. 1, 9, and 10) with a pivot at the center of gravity.

In some embodiments of the present invention, an isolation mount is provided having a "soft" mount with improved vibration-dampening properties combined with a stiffer mount to reduce larger shocks between the disc case and the external mount. Since the soft mount can sag due to the weight of the disc case and its contents, and in order to reduce the rotational impulse transferred to the disc case by a seek operation, some embodiments include a rotational mount (e.g., 970–971 of FIG. 9) that provides soft rotational dampening (due to pads 920–923) and that allows a relatively free movement of the disc case relative to the external mount for a rotational movement around the center of mass 971 due to actuator movement, but constrains axial movement of the disc case. In some embodiments, the rotational mount includes a soft mount for rotational movement or vibration combined with a stiffer mount for axial movement.

The invention described in this application is useful for all types of disc drives, including hard-disc drives, ZIP drives, floppy-disc drives, and any other type of drives, systems of drives (such as a "redundant array of inexpensive/independent disc drives," or RAID, configuration) or other devices, where a disc assembly is rotated within a housing.

The invention described in this application is useful with many electrical and mechanical configurations of disc drives having either rotary or linear actuation. In addition, the invention is also useful in all types of disc drives including hard disc drives, zip drives, floppy disc drives and any other type of drives where providing a low-noise current source for the transducer may be desirable. FIG. 1 is an exploded view of one embodiment of the present invention, this embodiment showing one type of a disc drive 100 having a rotary actuator. The disc drive 100 includes a housing or disc case 110. Rotatably attached within disc case 110 on an actuator shaft 118 is an actuator assembly 120. The actuator assembly 120 includes a plurality of arms 123. Attached to the separate arms 123, are load beams or load springs 124. Load beams or load springs are also referred to as suspensions. Attached at the end of each load spring 124 is a slider 126 which carries a magnetic transducer 158. The slider 126 with the transducer 158 form what is many times called the head. It should be noted that many sliders have one transducer 158 and that is what is shown in the figures. It should also be noted that this invention is equally applicable to sliders having more than one transducer, such as what is referred to as an MR or magneto resistive head in which one transducer 158 is generally used for reading and another is generally used for writing. On the end of the actuator assembly 120 opposite the load springs 124 and the sliders 126 is a voice coil 128.

Attached within the disc case 110 is a magnet assembly 130. The magnet assembly 130 and the voice coil 128 are the key components of a voice coil motor which applies a force to the actuator assembly 120 to rotate it about the actuator shaft 118. Also mounted to disc case 110 is a spindle motor. The spindle motor includes a rotating portion called spindle hub 133. In this particular disc drive, the spindle motor is within hub 133. In FIG. 1, one or more discs 134 are attached to the spindle hub 133 to form disc assembly 132. In other disc drives, a single disc or a different number of discs may be attached to the hub. The invention described herein is equally applicable to disc drives which have a plurality of discs as well as disc drives that have a single disc. The invention described herein is also equally applicable to disc drives with spindle motors which are within the hub 133 or under the hub.

In some embodiments, a rotary mount (170, 172 and 171, 173 of FIG. 1) is provided. In some embodiments, bearing 170 (e.g., a ball-bearing assembly or a sleeve bearing) affixed to external mounting member 150 and axle 172 affixed to disc case 110 along its center of mass support one face of disc case 110, and bearing 171 affixed to external mounting member 151 and axle 173 affixed to disc case 110 along its center of mass support the opposing face of disc case 110, allowing disc case 110 to rotate around the common axis of axle 172 and axle 173. In other embodiments, bearing 170 is affixed to case 110 and axle 172 is affixed to external mounting member 150 (in some such embodiments, bearing 171 and axle 173 are also swapped in position). In yet other embodiments, bearing 170 and axle 172 are replaced by a piece of flexible adhesive, such as a circle of double-sided foam adhesive tape. In some such embodiments, bearing 171 and axle 173 are also replaced by a piece of flexible adhesive. In some embodiments, posts 160 are surrounded by a soft dampening material, such as shown in FIG. 3. In other embodiments, one or more of the isolation mounts of FIGS. 2–10 are combined and used with the bearing pivot mounting described for FIG. 1 above.

Figure 2:
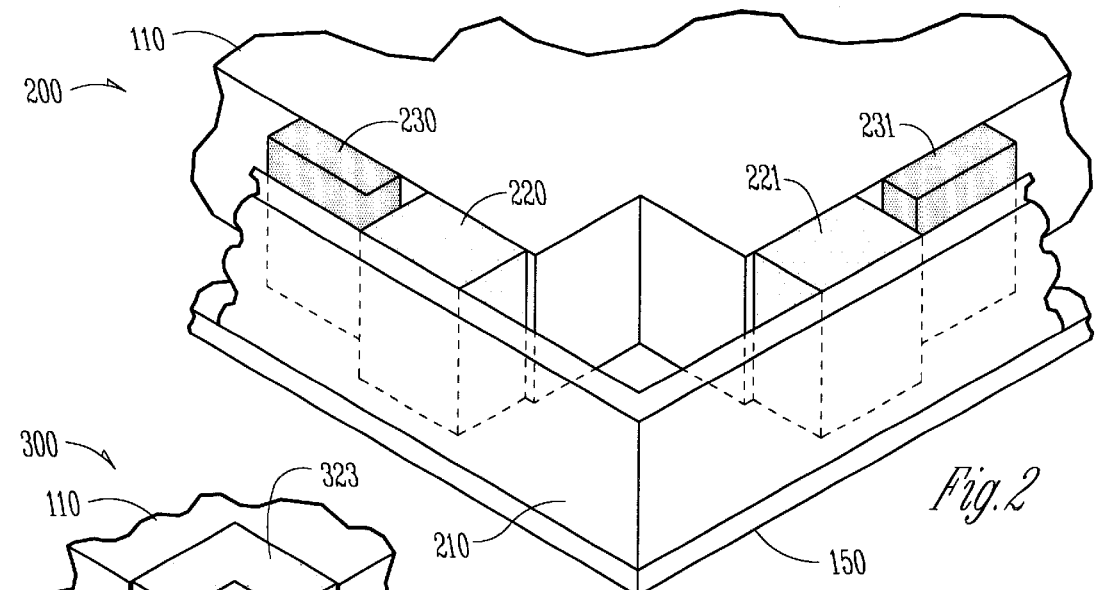
FIG. 2 is an isometric cutaway view of an isolation mount 200 incorporating the present invention.

FIG. 2 is an isometric cutaway view of an actuator isolation mount 200 incorporating the present invention. In some embodiments, as shown in FIG. 2, external mounting member 150 includes or is attached to wall 210 surrounding two sides of the corner of external mounting member 150. Dampening members 220 and 221 provides an acoustic isolating function for disc case 110 during seek operations, and dampening for the rotary motion that is allowed and promoted by the rotary mount described for FIG. 1. In other words, the dampening members 220 and 221 dampens moments produced as a result of the actuator 120 seeking.

Consequently, the present invention lessens acoustic emissions from the disc drive. For every force that is imparted inside the disc drive there is an opposite force, so when the actuator is moved rapidly from one disc location to another, an impulse force is placed onto the actuator. An opposite or reactionary force opposing the impulse force is produced by the base plate of the head disc assembly ("HDA"). A common requirement for disc drives has been to perform seeks more quickly. Quicker seeks translate into larger impulse forces applied to the actuator assembly 120.

The softer dampening members 220 and 221, affixed to both the disc case 110 and external mounting member 150, absorb a portion of the energy between the disc case 110 and external mounting member 150 to limit the amount of energy emitted as sound. In the presence of an impulse force, such as the forces used to move the actuator during seek operations, the impulse force induces a vibrations and the vibrations translate into sound energy.

In some embodiments, stiffer dampening elements 230 and 231 are affixed to and normally in contact with only disc case 110 with a small gap between them and wall 210. In some embodiments, this provides dampening of relatively large shocks only after a predetermined threshold. In other embodiments, stiffer dampening elements 230 and 231 are affixed to wall 210 with a gap between them and disc case 110. These stiffer dampening elements 230 and 231 provide a stop for larger shocks such as occur with manual handling and shipping of drive 100. These allow softer dampening members 220 and 221 to absorb small movements such as occur during seek operations.

FIG. 3 is an isometric cutaway view of an isolation mount 300, a portion of some embodiments of the present invention. In some embodiments, mount 300 includes isolation member 323 that is a very soft foam rubber that is in contact with disc case 110 and post 160. In some such embodiments, isolation member 323 is affixed with adhesive to both disc case 110 and post 160. In some embodiments, isolation member 323 is a graded or progressive foam rubber that is soft for small motions but stiffer for larger and larger movements. In other embodiments, springs or other isolation members are substituted for foam member 323.

Figure 4:
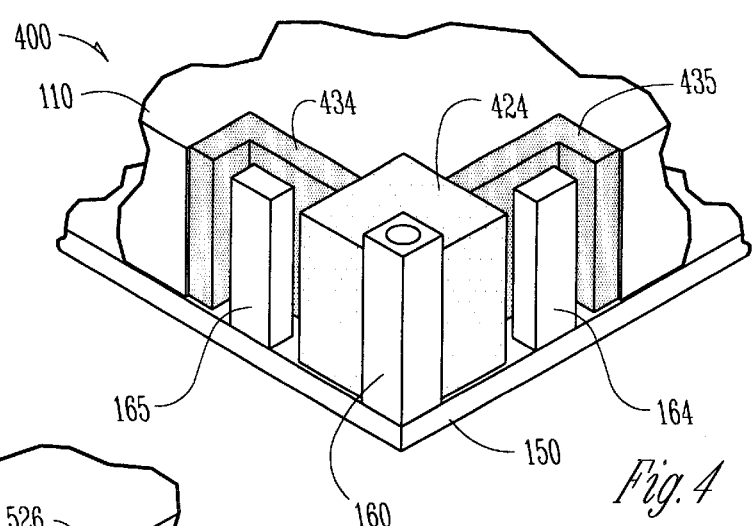
FIG. 4 is an isometric cutaway view of an isolation mount 400 incorporating the present invention.

FIG. 4 is an isometric cutaway view of an isolation mount 400, a portion of some embodiments of the present invention. Relatively stiffer foam portions 434 and 435 partially surround posts 165 and 164, respectively, without touching them. Relatively softer foam portion 424 partially surrounds post 160.

Figure 5:
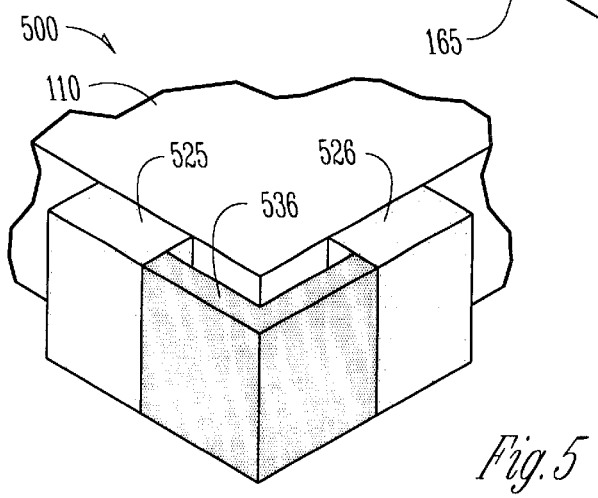
FIG. 5 is an isometric cutaway view of an isolation mount 500 incorporating the present invention.

FIG. 5 is an isometric cutaway view of an isolation mount 500, a portion of some embodiments of the present invention. Relatively stiffer foam portion 536 partially surrounds a corner of disc case 110 without touching it. Relatively softer foam portions 525 and 526 are touching adjacent portions of disc case 110. In some embodiments, a wall such as wall 210 of FIG. 2 is supporting foam portions 525, 526, and 536.

Figure 6:
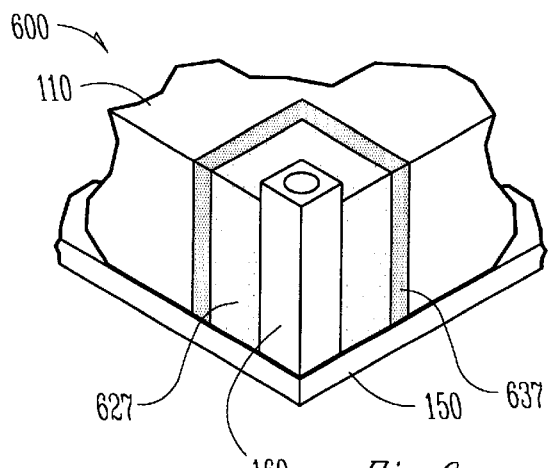
FIG. 6 is an isometric cutaway view of an isolation mount 600 incorporating the present invention.

FIG. 6 is an isometric cutaway view of an isolation mount 600, a portion of some embodiments of the present invention. Relatively stiffer foam portion 637 is in series with relatively softer foam portion 627. Small deflections are absorbed by portion 627, while larger deflections are absorbed by portion 637.

Figure 7:
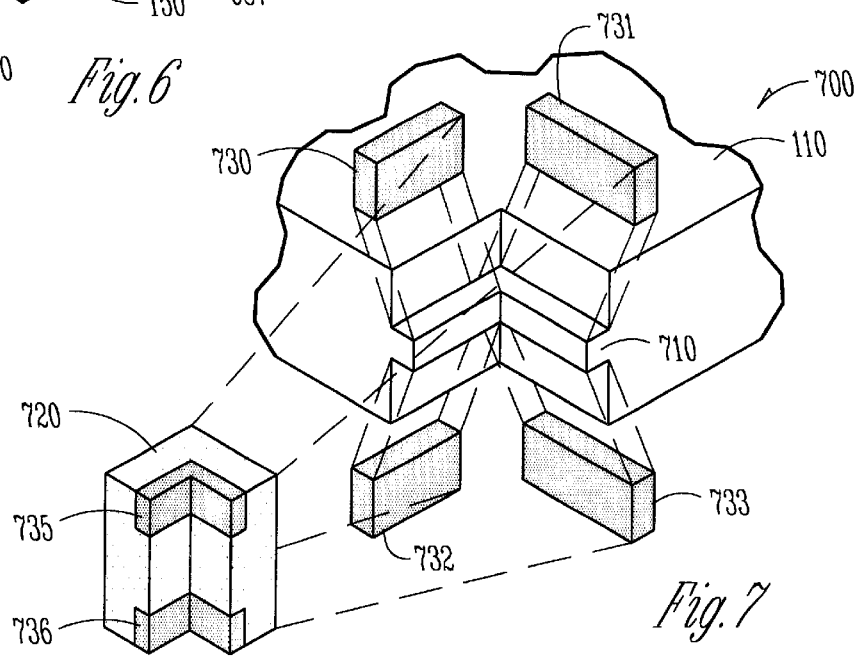
FIG. 7 is an isometric cutaway view of an isolation mount 700 incorporating the present invention.

FIG. 7 is an isometric cutaway view of an isolation mount 700, a portion of some embodiments of the present invention. Relatively stiffer foam portions 730–736 provide protection from larger deflections, while relatively softer foam portion 720 absorbs smaller deflections. A center rib extension 710 provides additional support for axial forces.

Figure 8:
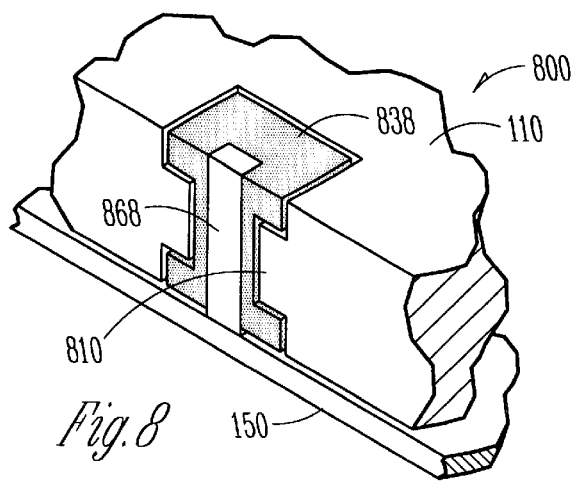
FIG. 8 is an isometric cutaway view of an isolation mount 800 incorporating the present invention.

FIG. 8 is an isometric cutaway view of an isolation mount 800, a portion of some embodiments of the present invention. "I" shaped foam isolation mount 838 surrounds post 868, and in some embodiments, is separated by a small gap from disc case 110 including center rib extension 810.

Figure 9:
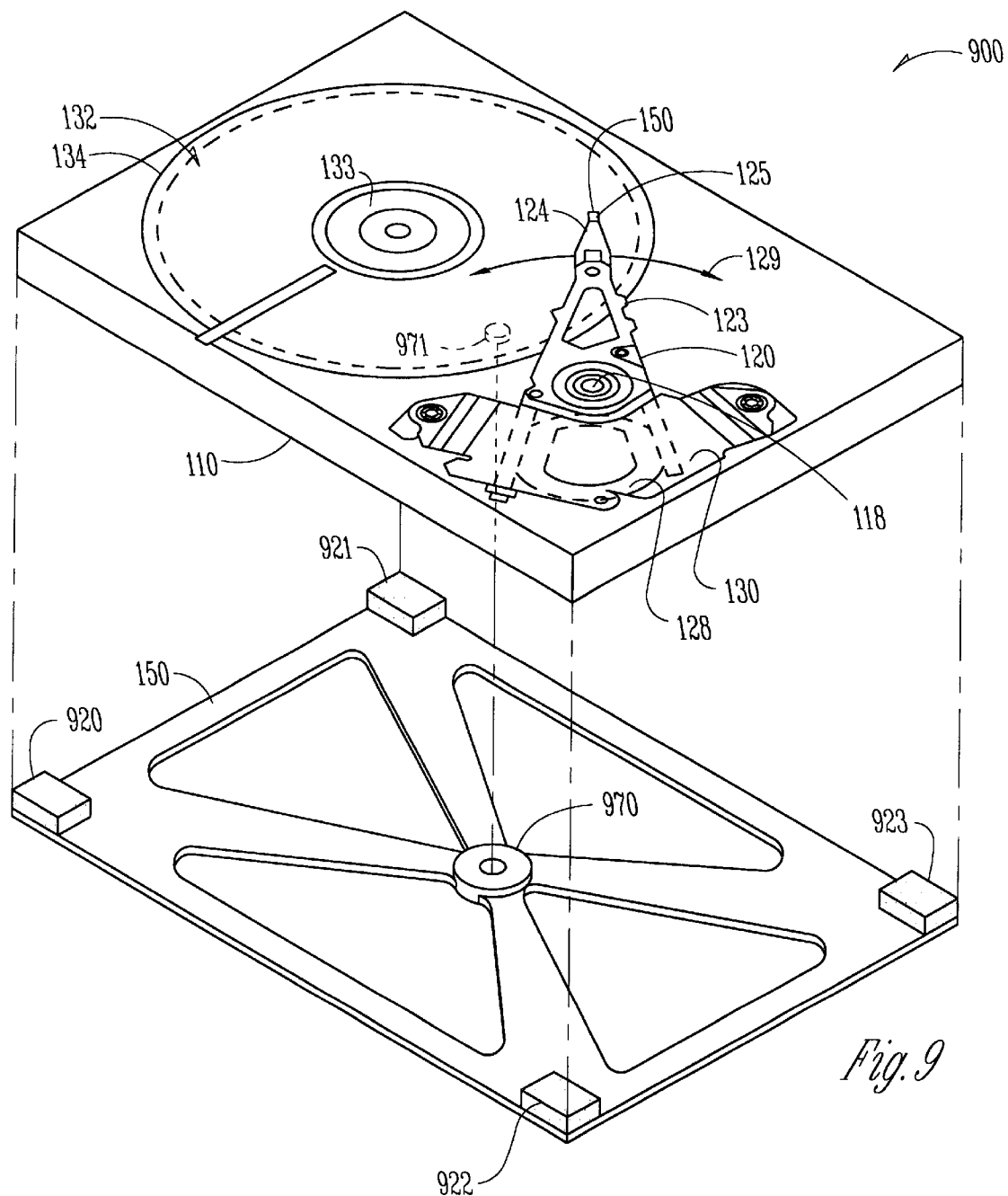
FIG. 9 is an exploded view of a disc drive 900 with a multiple disc stack and a rotary mount.

FIG. 9 is an exploded view of a disc drive 900 with a multiple disc stack and a rotary mount 970–971. In some embodiments, disc drive 900 is vertically mounted and rotary mount 970–971 provides cantilevered support from only one side of disc case 110, in order to reduce weight and thickness, compared to the embodiment of FIG. 1. In some embodiments, four soft foam isolation mounts 920–923 between external mounting member 150 and disc case 110 provide dampening and centering force.

FIG. 10 is an exploded view of a disc drive 1000 with a multiple disc stack and a rotary mount that includes bearing 970 and shaft 971. In some embodiments, disc drive 1000 is vertically mounted and rotary mount 970–971 provides cantilevered support from only one side of disc case 110, in order to reduce weight and thickness, compared to the embodiment of FIG. 1. In some embodiments, four soft foam isolation mounts 1020–1023 between a plurality (e.g., four) posts 160 and disc case 110 provide dampening and centering force.

FIG. 11 is an exploded view of a disc drive 1100 with a multiple disc stack. In some embodiments, four soft foam isolation mounts 920–923 between external mounting member 150 and disc case 110 provide dampening and centering force.

CONCLUSION

Described above is a method and apparatus for reducing and/or isolating actuator and other internal vibrations in a disc-drive system. One embodiment provides a disc drive 100 having a rotary actuator. The disc drive includes a base 112 and a cover 114. The base 112 and cover 114 form a disc enclosure. Rotatably attached to the base 112 on an actuator shaft 118 is an actuator assembly 120. The actuator assembly 120 includes a comb-like structure 122 having a plurality of arms 123. At the far end of the separate arms 123 is a magnetic transducer 158. In some embodiments, transducer 158 includes an electromagnetic coil write head 97 (not shown) and a magneto-resistive read head 98 (not shown).

One aspect of the present invention provides a disc drive 100 or 900 or 1000 or 1100 that includes an external mounting member 150, a disc case 110, and an actuator assembly 120 mounted within the disc case 110. The actuator assembly 120 has a shaft 118, the shaft having a rotational axis. The disc drive 100 also includes at least one damper (e.g., 220, 221, 230, 231, 323, 424, 434, 435, 536, 525, 526, 627, 637, 720, 730–736, 838, 920, 921, 922, 923, 1020, 1021, 1022, and/or 1023) holding the disc case to the external mounting member that allows rotational movement of the disc case relative to the external mounting member in order to reduce the emission of sound from the disc case.

In some embodiments, the damper comprises an energy-absorbing isolation material. In some embodiments, the damper is softer to rotational movements than to axial movements. In some embodiments, the damper dampens vibrations substantially parallel to the rotational axis of the shaft of the actuator assembly.

In some embodiments, the damper includes a softer part (e.g., 220) and a stiffer part (e.g., 230), wherein the softer part acts primarily for relatively small movements of the disc case and the stiffer part acts primarily for relatively large movements of the disc case.

In some embodiments, the disc case 110 includes a recess therein, the damper positioned within the recess, substantially flush to a surface of the disc case.

In some embodiments, the damper includes a rotational mount (170&172, 171&173, 970&971, and/or 920, 921, 922 and/or 923) that allows the disc case to rotate relative to the external mounting member 150 about a center of mass of the disc case 110.

Another aspect of the present invention provides a disc drive 100 or 900 or 1000 or 1100 that includes an external mounting member 150, a disc case 110, an actuator assembly 120 mounted within the disc case, and at least one damper (e.g., 220, 221, 230, 231, 323, 424, 434, 435, 536, 525, 526, 627, 637, 720, 730–736, 838, 920, 921, 922, 923, 1020, 1021, 1022, and/or 1023) holding the disc case to the external mounting member, the damper including a softer part and a stiffer part, wherein the softer part acts primarily for relatively small movements of the disc case and the stiffer part acts primarily for relatively large movements of the disc case.

In some embodiments, the softer part and the stiffer part touch each other at an interface located between the disc case and the external mounting member.

In some embodiments, the softer part and the stiffer part are physically separated from each other, and wherein the softer part is always in contact with both the disc case and the external mounting member and the stiffer part is in contact with both the disc case and the external mounting member only for transitory periods.

In some embodiments, there is a gap adjacent to the stiffer part that closes only under shocks larger than an actuator seek force.

Yet another aspect of the present invention provides a method for reducing vibrations of an actuator assembly entering a case of a disc drive. The method includes allowing more rotational movement of the case within a frame than is allowed of another mode of movement, and dampening rotational vibrations of the case.

In some embodiments of the method, the allowing step further includes allowing rotation about a center of mass of the case.

In some embodiments of the method, the dampening step further includes further dampening shocks only after a predetermined threshold.

Still another aspect of the present invention provides method for reducing ambient disc drive acoustic emissions in a disc drive having a case mechanically coupled to an external mounting member, and having an actuator assembly rotatably attached within the case. This method includes dampening seek vibrations between the case and the external mounting member, and absorbing shocks larger that the seek vibrations.

In some embodiments of the method, the dampening step further includes allowing rotational movements of the case relative to the external mounting member.

Some embodiments of the method further include holding the case to the external mounting member with a rotary mount.

In some embodiments of the method, the dampening step further includes affixing the elastomeric dampening element to one or more of the case and the external mounting member.

In some embodiments of the method, the dampening step further includes attaching soft foam material to the case with an adhesive.

It is to be understood that the above description is intended to be illustrative, and not restrictive. Although numerous characteristics and advantages of various embodiments of the present invention have been set forth in the foregoing description, together with details of the structure and function of various embodiments, many other embodiments and changes to details will be apparent to those of skill in the art upon reviewing the above description. The scope of the invention should, therefore, be determined with reference to the appended claims, along with the full scope of equivalents to which such claims are entitled.

What is claimed is:

1. A disc drive comprising:

an external mounting member;

a disc case;

an actuator assembly mounted within the disc case, the actuator assembly having a shaft, the shaft having a rotational axis; and at least one dampener holding the disc case to the external mounting member that allows rotational movement of the disc case relative to the external mounting member in order to reduce the emission of sound from the disc case, wherein the dampener is softer to rotational movements than to axial movements.

2. The disc drive of claim 1, wherein the damper comprises an energy-absorbing isolation material.

3. The disc drive of claim 1, wherein the damper dampens vibrations substantially parallel to the rotational axis of the shaft of the actuator assembly.

4. The disc drive of claim 1, wherein the damper includes a softer part and a stiffer part, wherein the softer part acts primarily for relatively small movements of the disc case and the stiffer part acts primarily for relatively large movements of the disc case.

5. The disc drive of claim 4, wherein the softer part and the stiffer part touch each other at an interface located between the disc case and the external mounting member.

6. The disc drive of claim 4, wherein the softer part and the stiffer part are physically separated from each other, and wherein the softer part is always in contact with both the disc case and the external mounting member and the stiffer part is in contact with both the disc case and the external mounting member only for transitory periods.

7. The disc drive of claim 6 further comprising a gap between the stiffer part and the disc case.

8. The disc drive of claim 6 further comprising a gap between the stiffer part and the external mounting member.

9. The disc drive of claim 1, wherein the disc case includes a recess therein, the damper positioned within the recess, substantially flush to a surface of the disc case.

10. The disc drive of claim 1, wherein the damper includes a rotational mount that allows the disc case to rotate within the external mounting member about a center of mass of the disc case.

* * * * *